Oct. 31, 1967 W. P. LEAR 3,350,025

MAGNETIC TAPE CARTRIDGE

Filed Aug. 31, 1964 3 Sheets-Sheet 1

INVENTOR
WILLIAM P. LEAR,
By Richard A. Marsen
his ATTORNEY

INVENTOR
WILLIAM P. LEAR,
By Richard A. Marsen
his ATTORNEY

MAGNETIC TAPE CARTRIDGE

Filed Aug. 31, 1964

INVENTOR
WILLIAM P. LEAR,
By Richard A. Marsen
his ATTORNEY

United States Patent Office 3,350,025

Patented Oct. 31, 1967

3,350,025

MAGNETIC TAPE CARTRIDGE

William P. Lear, Wichita, Kans., assignor to Lear Jet Industries, Inc., a corporation of Delaware Filed Aug. 31, 1964, Ser. No. 393,083
1 Claim. (Cl. 242—55.19)

This invention relates to magnetic tape cartridges, and more particularly to novel cartridge construction and configuration for endless tape that is self-contained, sturdy and simple to use.

The cartridge of the present invention is effectively and directly handled for insertion-to-play, standby-hold or removal from the player unit. It is provided with a unique notch arrangement that coacts with a retention roller in the player. By using two successive notches, manual positioning of the cartridge determines its operational mode. This permits the use of a slotted opening in the player for the cartridge, and effects its playing directly, without the need for collateral levers or controls. Such player system is shown and described in the copending patent application, Combination Radio and Magnetic Cartridge Player, Ser. No. 392,212 filed Aug. 26, 1964, and assigned to the same assignee.

Finger grips are incorporated at the rear section of the cartridge hereof for its operational handling. A recessed region is provided at the back end of the cartridge to protect a contained card or label denoting the title or contents of the tape recordings therein. Further a ramp is made integral with the cartridge forward end to permit the retention roller of the player to ride up the cartridge side to the hold-notches. A novel wafer plate is placed over the magnetic tape reel to stabilize its endless pathways. The pinch roller is mounted within the cartridge on a composite wire spring that biases the roller for play, and latches the reel during the non-play mode.

These and further features, advantages and objects of this invention will become more apparent from the following description of an exemplary embodiment thereof, illustrated in the drawings, in which.

Figure 1:
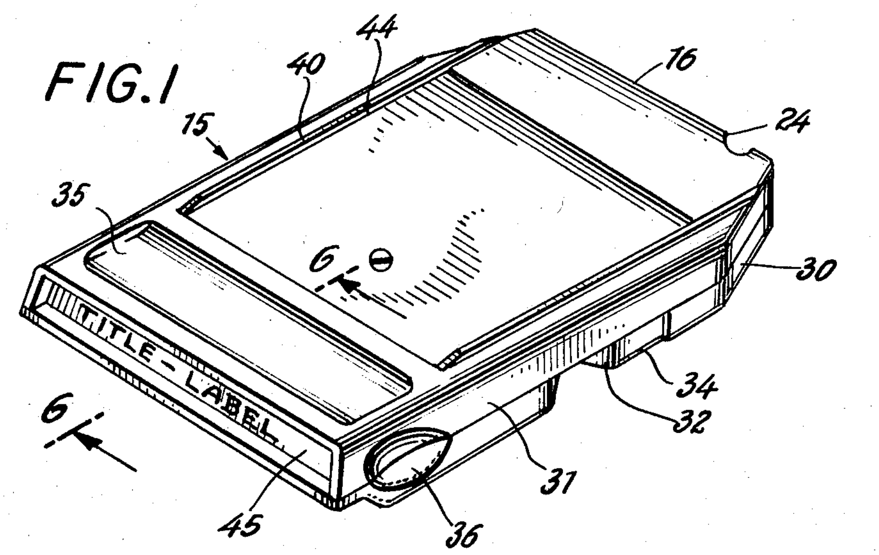
FIG. 1 is a perspective illustration of the exemplary cartridge of the present invention.

The magnetic tape cartridge 15 is basically constructed of rugged molded components and relatively inexpensive for mass marketing. Cartridge 15 is designed as an essentially self-contained unit, with a reel of tape 20 in endless array therein. In use, the cartridge is manually positioned in the player, to effect direct play without auxiliary manipulation. The player system and unit therefor is shown in the aforementioned patent application. The forward end 16 of the cartridge 15 is inserted into the slotted region of the player chassis.

The pinch roller 17 is rotatably mounted on a wire spring 18, and biased outwardly for engagement with drive capstan 19, with the tape loop portion 21 therebetween. The forward end 16 abuts a fixed stop 22 to set the cartridge 15 in the play position. Besides engagement with the capstan, the tape loop 21 is pressed against the face of the magnetic pick-up head 23. The tape 21 is moved past head 23 at a predetermined uniform velocity, for reproduction of the recordings on the tracks on the tape. A semi-circular forward cut-out 24 permits the capstan 19 to somewhat enter the cartridge end 16 and coact with the container roller 17. A spring-pressed pad 25 stably holds tape 21 against the head 23.

Figure 2:
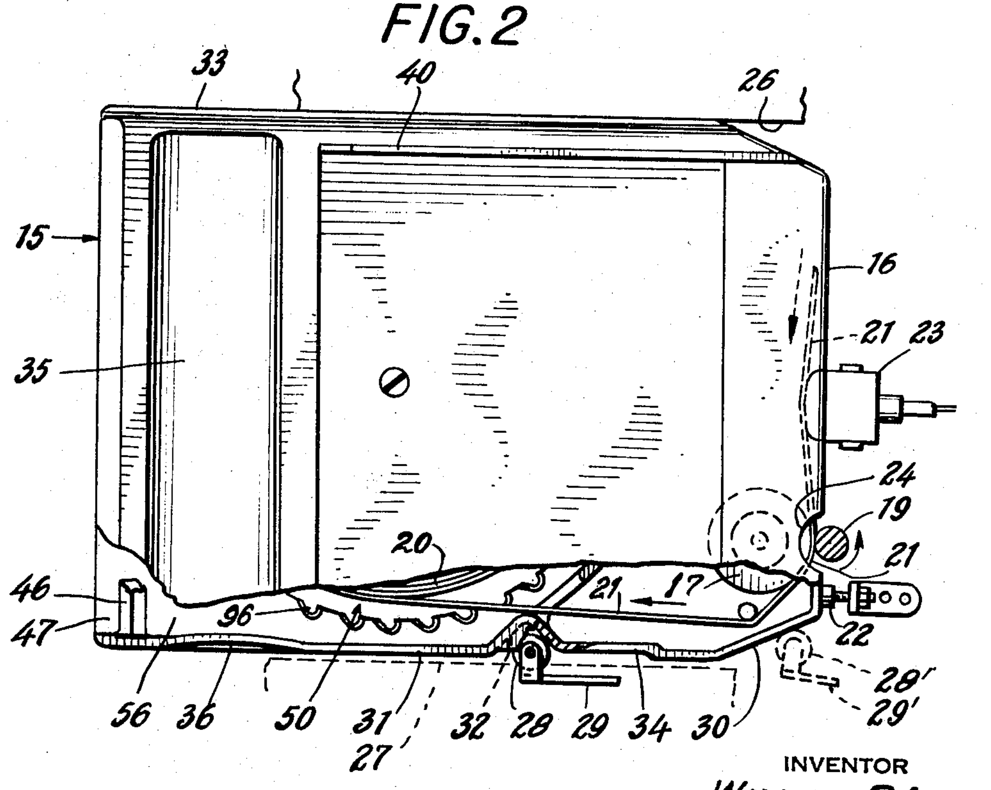
FIG. 2 is a plan view of the cartridge, partly broken-away, and in coaction with the player retention roller.
Figure 3:
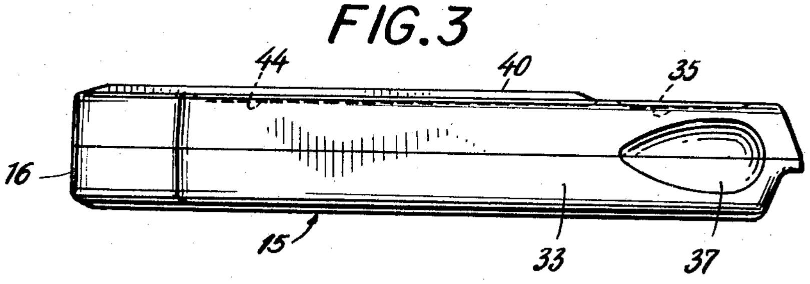
FIG. 3 is an elevational view of the cartridge, as seen from the left side of FIG. 1, opposite the notched side.
Figure 4:
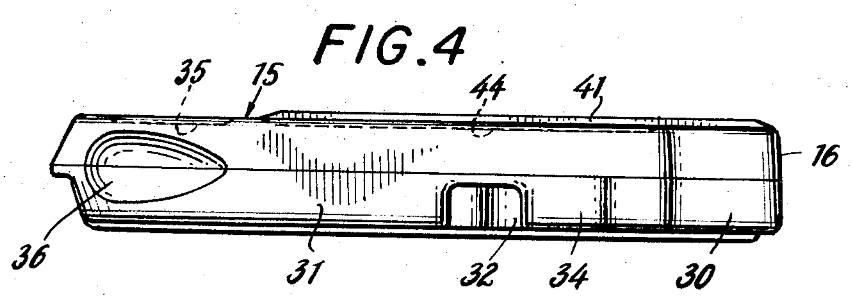
FIG. 4 is an elevational view of the notched side of the cartridge.
Figure 5:
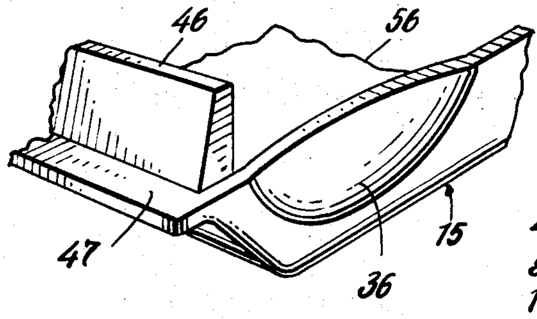
FIG. 5 is an enlarged partial view of a rear corner of the lower cartridge section.

The cartridge region within the player contains a side guide 26 opposite the one, indicated by dotted line 27, that contains a retention roller 28. The forward cartridge end 16 has its corner, on the notched side 31, inclined in the form of a ramp 30. The roller 28 is biased inwardly towards the cartridge 15 by leaf spring 29. The ramp 30 engages the roller initially, as indicated schematically at 28', and thereupon moves it outwardly to the cartridge side 31. The ramp 30 permits the cartridge 15 to be moved forward, beyond the roller (28) position. When fully "seated" against the stop 22, the notch 32 in the side 31 of the cartridge is firmly engaged with the roller 28 (see FIG. 2).

The roller 28 latches the cartridge 15 in its play mode, pressing its side 33 against the side-guide 26 into stable physical relation. The notch 32 has a forward inclined portion against which the roller 28 presses in this play mode. The resultant force components include one that maintains the forward cartridge end 16 in this tape play position, firmly against stop 22, head 23, and capstan 19. A second notch 34 is a shallow indentation in side 31, forward of notch 32. Notch 34 engages retention roller 28 before notch 32 is reached upon cartridge insertion. Such intermediate position of the cartridge 15, held at its notch 34, is its "hold" mode in the player, as described in the aforesaid copending case.

Spring 29 exerts sufficient force on retention roller 28 to maintain the cartridge 15 firmly in play position, even over bumps when in mobile use. The ramp 30 facilitates cartridge insertion, as set forth. The cartridge is pulled-out of the player upon disengagement with the roller 28. The cartridge hereof is provided with built-in finger grip areas to aid and insure ready handling in its manual insertion and removal from the player. The grip areas are at the back region of the cartridge.

A top finger grip cavity 35 extends laterally across the upper rear region. Finger cavities 36, 37 are formed in cartridge sides 31 and 33 respectively, near the outer or rear section thereof. As this cartridge section remains exposed, even when inserted in its play mode, one can readily maneuver it into its respective removal, play or hold modes. The exemplary cartridge is 4.0" wide, 5.5" long and ⅞" thick. Its contained tape reel, with eight recorded tracks, driven at 3.75" per second provides two hours of two-track stereophonic music playing. The cartridge 15 is readily handled with one hand, for direct control, even while driving an automobile. Its use and control is as simple as operating the radio in the automobile.

The cartridge 15 incorporates two parallel longitudinal ridges 40, 41 on its cover, near its sides. The base is grooved at 42, 43 with parallel portions that are arranged to overlap corresponding ridges 40, 41 of another cartridge upon which it is stacked. This prevents their side slippage when stacked. The cover has a slight depression in the region 44 between ridges 40, 41 into which a card or label is pasted that contains a list of the recordings therein. A title label 45 is attached to a recessed panel 46 across the back 47 of the cartridge 15. The panel 46 is integral with the base of the cartridge. The external face of the panel 46 is inclined to better show up the label 45. The visible yet interior position of the label affords it protection from handling.

The cover and base of the cartridge are molded of rugged composition material, with good impact resistance and high heat stability, such as styrene. I prefer to make these external cartridge parts bone white in color. This color reflects radiant rays and thus better preserves the cartridge against mechanical distortion when exposed to sunshine. Snarls in the tape or uneven tape movement are thus avoided when a cartridge is left on a car seat in the sun.

Figure 8:
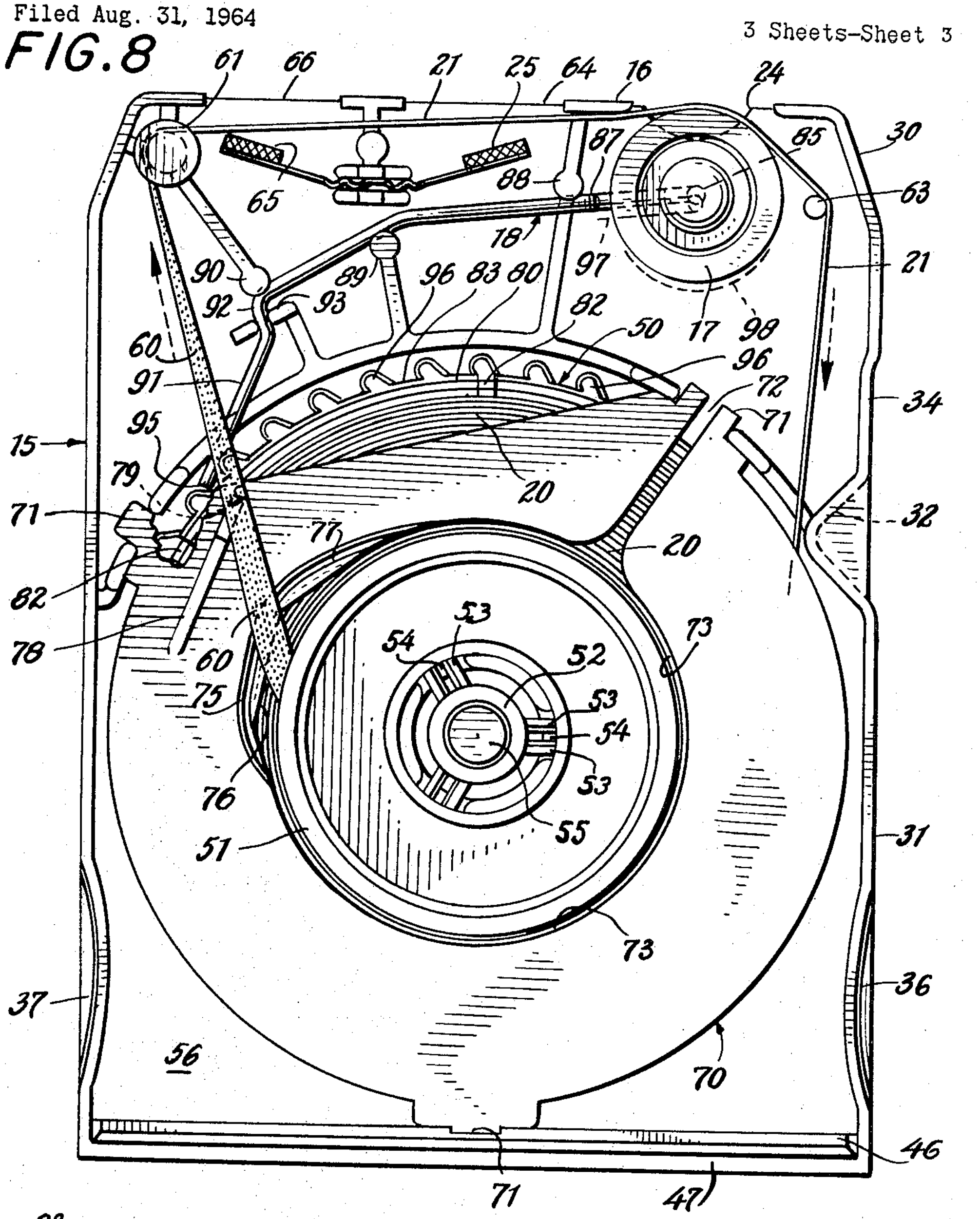
FIG. 8 is a plan view of the cartridge interior, with the cover removed.

FIG. 8 is a plan view showing the interior mechanism of cartridge 15. The magnetic tape reel 20 is supported on the disc-base of a spool 50, and surrounds a central hub 51. Hub 51 is attached to the core 52 of the spool 50, across grip-fingers 53, 53 thereof, onto extending hub pins 54, 54. The spool core 52 is rotatably supported on a post 55 vertically disposed on the base 56 of the cartridge. The spool 50 turns freely above base 56, in response to tape motion. When the pinch roller 17 is driven by capstan 19 (see FIG. 2), the tape loop portion 21 winds about the tape reel 20 as outer convolutions, that are arrayed spirally towards the hub 51. The hub 51 has an inwardly inclined wall against which the innermost tape turn or convolution coacts to skew or tilt the tape portion 60 as it exits. An exemplary spool 50 and hub 51 construction is shown in my copending patent application Spool Construction for Magnetic Tape Ser. No. 393,326, filed Aug. 31, 1964 and assigned to the assignee hereof.

The exiting tape portion 60 extends about guide post 61 and merges with loop portion 21 that coats with pinch roller 17, and thereupon rides about post 63 to enter the reel 20. The magnetic playback head 23 enters opening 64 at the forward end 16 of the cartridge, and presses tape portion 21 against spring-pressed felt pad 25. Circuit contacts (not shown) enter opening 66, pressing forward tape portion 21 against felt pad 65. When the capstan 19 operates against the roller 17, with the tape loop portion 21 therebetween, it is moved past the head 23 and the contacts. The skewed tape portion 60 is payed out of the inner reel convolution contiguous with the wall of hub 51. The free rotation of the spool 50 and reel 20 thereon facilitates this process.

A wafer 70 of composition material, as styrene, is fitted over the reel 20. Wafer 70 contains radial ears 71, 71 that fit into corresponding grooves molded in the cartridge base 56. The wafer insures that the reel convolutions essentially stay "in-line" as a reel, in formation, and flat upon the spool base. A slit 72 in wafer 70 permits its insertion about tape portion 60. A circular central opening 73 fits about the hub 51. The exiting tape portion 60 passes over a smoothed-out border region 75 at the wafer interior region. The compound or three-dimensional curvature at the tape feed-out position 75 is empirically attained for smooth paying-out of the tape. An open region 76 in wafer 70, radially beyond the central opening 73, permits relative freedom of the tape portion 60 to exit from its inner convolution configuration.

Correspondingly, the curvature 75 at the edge 76 of wafer 70 is extended to the order of two tape widths in width, and a related curvature 77 on the opposite side of the normal pay position illustrated. The regions 75, 76, 77 are made particularly smooth to eliminate frictional factors. A ramp 78 extends above wafer 70, molded therewith in triangular configuration, with apex at 79. The tape portion 60 rides over ramp 78, 79 flush, in predetermined formation to guide post 61. The wafer surfaces 75, 76, 77 and the ramp 78, 79 coact to skew the tape from the reel interior at the hub 51, as at 20° to the vertical, out across the cartridge as portion 60, and to the vertical at post 61. The wafer 70 hereof and hub 51 provide smooth payout with minimal fluctuation in tape tension, and elimination of ripple in the tape.

Figure 6:
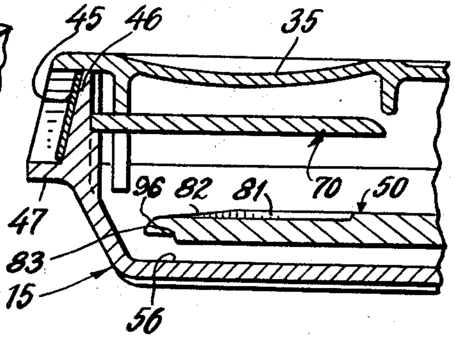
FIG. 6 is a cross-sectional view through the rear section of the cartridge, taken along the line 6—6 of FIG. 1.
Figure 7:
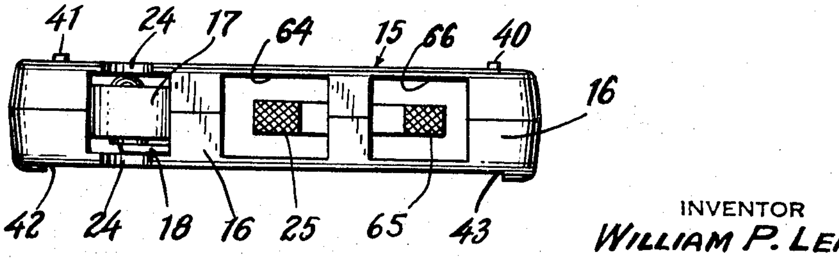
FIG. 7 is an elevational view of the forward end of the cartridge.

An important feature of my present invention is the automatic provision of separation of the tape convolutions 80 as they are formed about the reel 20. This action insures the spiral action of the endless tape configuration, as it is formed and payed-out. Towards this end there are radial flat ridges 81, 81 about the base of spool 50 (see FIG. 6), with their edge regions 82 sloped downwardly towards the rim 83. The entering loop 21 thus is below the main reel plane and rides up inclines 82, 82 in forming the outer convolutions 80, en route to the main reel 20 in tape play. Further details thereof are shown and described in my copending application Ser. No. 393,326 referred to above.

Figure 9:
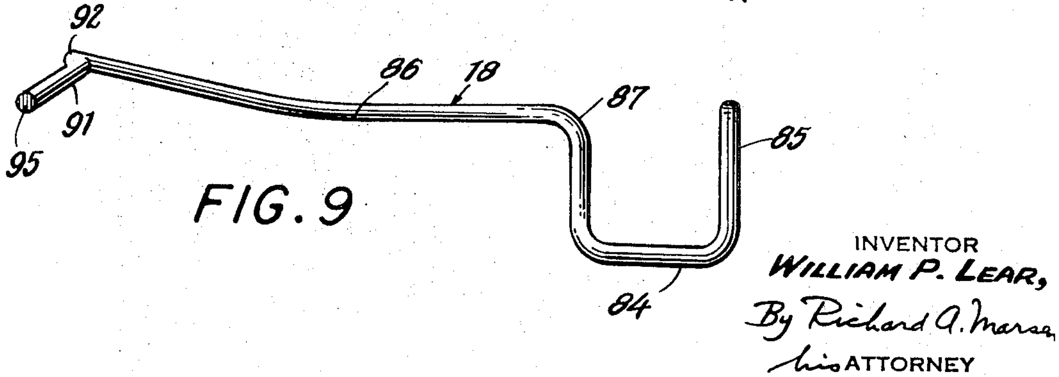
FIG. 9 is an elevational view of the composite spring used in the invention cartridge.

The spring 18 upon which the pinch roller mounts has an end loop 84 and support rod 85. The loop 84 depends from the body 86 of the spring at bend 87, as shown in FIG. 9. The spring 18 is of music wire, .080" in diameter, or equivalent. It is shaped to fit about three posts 88, 89, 90 set in the cartridge base 56. The posts override the spring 18 so that it is rotatable in the manner described. The tip portion 91 of spring or wire 18 extends from a compound bend region 92 that rides in a notch in post 93, that also guides the movement of tip 95 with respect to the spool 50.

The normal biased configuration of spring 18 is as shown in FIG. 8. The tip 95 of the wire 18 is at the level of the spool edge 83 and coacts with projections 96, 96 spaced along the spool rim 83. In this non-operation mode, the spring tip 95 engages a notch between two projections 96, 96 to firmly latch the spool against angular displacement. The tape reel is thus maintained stably when the cartridge is stored or in non-play. When the capstan 19 is pressed against roller 17, the roller tilts into more vertical orientation, to be parallel with the capstan. This operative position of the roller 17 is indicated by dotted lines 97, 98.

The compound spring 18 hereof is very useful and important in the operation of the cartridge 15. The spring 18 can be turned, in effect twisted, about its effective axial extent, in its "bearings" at posts 88, 89, 90. The spring bias normally holds pinch roller 17 in the outwardly direction, towards cut-out 24. The roller 17 is tilted, and held rotatable on the wire spring rod end, as set forth. The wire tip 95 serves to initially slow down spool 70 when applied thereagainst (and reel 20), and arrest it in latching relationship at spool edge projections 96, 96. The relatively large number of projections 96 permits stoppage of the spool 70 in close angular positions, and hold the endless tape reel intact. The exemplary projections 96, 96 are rounded, and tilted in the direction opposite to the spool rotation, at about 18°. This facilitates coaction with the latch tip 95.

The pinch roller 17, suspended in angular spring swing arrangement, automatically aligns itself axially parallel with the capstan 19 when the cartridge 15 is fully inserted in the player and notched-in for play. Such parallelism insures precise concentricity, and smooth drive and transport of the tape loop 21 therebetween, and thus avoid flutter and wow. Further, the cost of such roller mounting is relatively very inexpensive. And very significantly, the engagement of the pinch roller 17 with the drive capstan 19 directly disengages the wire tip 95 from the spool edge and projections 96, 96. The spool 70 and reel 20 thereon are thereupon freed for rotation and spooling in the play mode.

This is due to the angular displacement of the spring 18 to its dotted loop position 97, and its tip 95 being tilted away from the spool 70, when roller is shifted to the play position at dotted line 98. The wire spring 18 acts as a torsion bar, and holds the roller 17 in proper pressure relation against the capstan, to move the tape. The relative length of the spring permits self-aligning of the roller to the capstan. The inexpensive simple spring 18 arrangement is thus seen to perform several functions: rotatably mount the pinch roller; self-align the roller with the capstan for tape drive; automatically release the spool and tape reel for play, when the capstan is engaged; automatically brake and latch the spool for the non-play mode.

Although the present invention has been set forth in connection with an exemplary embodiment, it is to be understood that variations and modifications thereof may be made within the broader spirit and scope of the invention, as set forth in the following claim.

I claim:

In a cartridge containing a rotatable spool having a serrated periphery for a reel of magnetic tape in endless array: a pinch roller about which the loop portion of the tape is passed for being transported when held pressed against a rotating capstan, a member with one end section rotatably mounting said pinch roller for operative presentation to the capstan when the cartridge is positioned for play, means pivotally mounting said member in the cartridge with its other end portion engageable with said serrations on the rim of said spool, said other member end portion being normally biased into engagement with the spool to hold it against rotation when the cartridge is not in play position and displaced to release said spool engagement when the pinch roller is in the play mode.

References Cited

UNITED STATES PATENTS

| | | | |
|---|---|---|---|
| 2,951,654 | 9/1960 | Steelman | 242—55.19 |
| 3,027,112 | 3/1962 | Flan | 242—55.13 |
| 3,030,041 | 4/1962 | Cousino | 242—55.19 |
| 3,075,427 | 1/1963 | Salzmann | 242—55.13 X |
| 3,161,362 | 12/1964 | Smith | 242—55.19 X |
| 3,243,134 | 3/1966 | Reed et al. | 242—55.19 |

FOREIGN PATENTS

| | | |
|---|---|---|
| 1,094,401 | 12/1954 | France. |

FRANK J. COHEN, *Primary Examiner.*

B. S. TAYLOR, *Examiner.*